Patented May 30, 1950

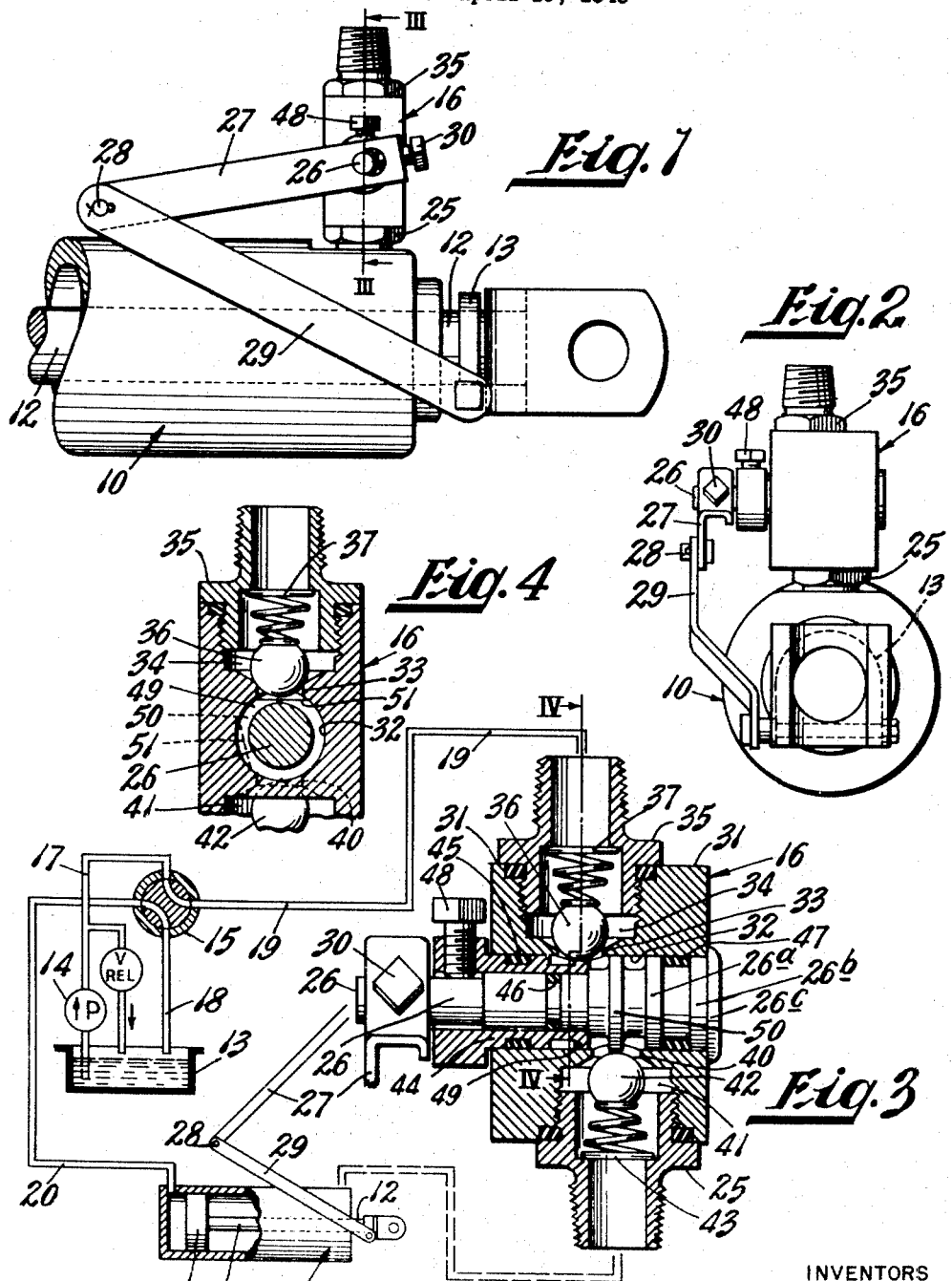

2,509,589

UNITED STATES PATENT OFFICE 2,509,589

VALVE

Clinton E. Deardorff, San Fernando, and William E. Elder, Sherman Oaks, Calif., assignors to Bendix Aviation Corporation, South Bend, Ind., a corporation of Delaware Application April 19, 1948, Serial No. 21,808

1 Claim. (Cl. 121—38)

This invention relates to fluid motors of reversible type adapted to be run alternatively in opposite directions to adjustable limit positions. Such motors usually consist of a cylinder containing a reciprocable piston, although they do not have to be of such type.

An object of the invention is to provide a simple, effective and practicable attachment for a reversible fluid motor that will automatically block fluid flow through, and stop, the motor when it reaches desired limit positions.

The invention is particularly useful in hydraulic systems in which the motor, the stroke of which is to be controlled, is to be located a substantial distance from the main control valve. It is recognized that it is not new to limit the stroke of a fluid motor by providing some sort of mechanical linkage between the movable element of the motor and the main control valve, to close the latter in response to a predetermined movement of the motor. However such mechanisms are often impracticable where the motor is spaced a substantial distance from the main control valve. As an example, it is now common to provide hydraulic systems whereby the operator of a farm tractor can hydraulically control an implement being drawn by the tractor. Such control systems comprise a pump and a manual control valve on the tractor which are connected by flexible hose lines to the hydraulic motor on the implement. Although it is frequently highly desirable to be able to limit the stroke of the motor on the implement, it is not feasible to do this by a mechanical linkage extending from the motor to the manual control valve, because there is no fixed spacial relationship therebetween. The present invention provides a practical solution for travel control of a motor under such circumstances, because it accomplishes the purpose with a valve rigidly mounted on the hydraulic motor itself.

A preferred valve for use in the present control is of the cam-actuated check valve type in which two check valves are oppositely disposed in one of the fluid lines leading to the motor so that unless the valves are forcibly held off their seats, one of them will prevent flow through the line in one direction, and the other will prevent flow in the opposite direction. The valves can be held off their seats by cams which are actuated by the movable element of the motor through an adjustable linkage. The cams are capable of rotation continuously in either direction so that there can be no damage should over-travel result from failure of the valve. The cams are normally operated in unison with each other and with the motor, but are individually adjustable so that the limit of movement of the motor in each direction is independently adjustable.

A full understanding of the invention may be had from the detailed description to follow, with reference to the drawing, in which:

Fig. 1 is a side elevation showing an end portion of a hydraulic jack incorporating a stroke-limiting mechanism in accordance with the invention;

Figure 2 is an end elevation of the apparatus shown in Fig. 1;

Fig. 3 is a combination of a sectional view of the valve taken in the plane III—III of Fig. 1 with a schematic diagram showing the hydraulic circuit in which the valve is incorporated; and Fig. 4 is a cross-section in the plane IV—IV of Fig. 3.

Referring first to Fig. 3, there is shown a hydraulic system that includes a motor cylinder 10 having a piston 11 and piston rod 12, a fluid reservoir 13, a pump 14, a manual 4-way valve 15, and a stroke-limiting valve 16 in accordance with the present invention. It will be observed that the pump 14 delivers fluid to the 4-way valve 15 through a pipe 17, and that fluid can be discharged from the valve 15 through a pipe 18 to the reservoir 13. By suitably rotating the valve 15, pressure fluid can be supplied through a pipe 19 and the valve 16 to the right end of the cylinder 10 and from the left end of the cylinder 10 through a pipe 20 through the valve 15 to the reservoir 13, causing the motor piston 11 to be moved to the left. Obviously, if desired, the valve 15 can be rotated in a neutral position in which fluid flow to and from either end of the motor cylinder 10 is blocked, or to a position in which the pump discharge is connected through the pipe 20 to the left end of the cylinder 10, and the pipe 19 is connected to the discharge pipe 18, for movement of the piston 11 to the right.

The valve 16 is controlled by the movement of the piston rod 12, to block flow of fluid into or out of the right end of the cylinder 10 when the piston has moved a desired distance in either direction.

For convenience of illustration, the valve 16 is shown disconnected physically from the motor cylinder 10 in Fig. 3, but in practice it is usually mounted rigidly on the cylinder, as shown in Fig. 1, by screwing it directly into one end port of the cylinder. Thus the threaded connection 25 (Fig. 3) of the valve 16 is shown screwed into one of the cylinder ports of the cylinder 10 in Fig. 1. Still referring to Fig. 1, the valve 16 has projecting therefrom a cam shaft 26 to which there is adjusted securely a crank arm 27 the outer end of which is pivotally connected by a pivot pin 28 to one end of a link 29, the other end of which is secured to the piston rod 12 by a yoke 13. Therefore, reciprocation of the piston rod 12 produces a rotation of the cam shaft 26. As will be described later, it is desirable to rotatably adjust the crank 27 with respect to the cam shaft 26, and such adjustment is readily achieved by loosening a set screw 30 that locks the crank 27 to the cam shaft 26.

Referring now to the sectional view of Fig. 3, the valve 16 comprises a body 31 having a bore 32 extending completely therethrough. This bore 32 is communicated by a valve seat 33 with a valve chamber 34 which is communicated by a fitting 35 with the pipe 19. The valve seat 33 can be closed by a ball check valve 36 which is urged against the seat 33 by a light compression spring 37. Longitudinally displaced along the bore 32 from the valve seat 33 is a similar valve seat 40 which communicatees the bore 32 with a valve chamber 41 into which the fitting 25 is screwed. This valve seat 40 is adapted to be closed by a ball check valve 42 which is urged against the seat 40 by a light compression spring 43.

The cam shaft 26 extends through the bore 32 and has lands 26a and 26b near its right end which bear against the bore 32 and rotatably support the right end of the cam shaft. An exterior flange 26c bears against the outer face 31 and limits longitudinal movement of the cam shaft to the left.

Within the left end of the block 31 the cam shaft 26 is rotatably supported by a cam sleeve 44 which in turn is rotatably supported by the bore 32.

Fluid leakage from the ends of the bore 32 is prevented by a sealing ring 45 between the cam sleeve 44 and the bore 32, a sealing ring 46 between the cam sleeve 44 and the cam shaft 26, and a sealing ring 47 between the cam shaft 26 and the bore 32.

Except during the process of adjusting the mechanism, the cam sleeve 44 is locked to the cam shaft 26 by a set screw 48, so that the sleeve and shaft rotate as a unit.

The cam sleeve 44 carries a cam 49 which is adapted to lift the check valve 36 off its seat 33, and the cam shaft 26 carries a cam 50 that is adapted to lift the check valve 42 off its seat 40. As shown in Fig. 4, the cams 49 and 50 may be of circular shape having a flat 51 thereon which when juxtaposed with the check valve 36 or 42 will permit the latter to seat. In all other positions the cam lifts its associated valve off the seat.

The operation of the device will now be described with reference to Figs. 1 and 3, in which the piston 11 is shown near its extreme left position to which it has been moved by fluid flowing from the pump 14 through the pipe 17, the valve 15, the pipe 19, and the valve 16 to the right end of the cylinder 10, fluid from the left end of the cylinder 10 having been simultaneously exhausted through the pipe 20, the valve 15, and the pipe 18 to the reservoir 13. It will be observed that during such fluid flow the check valve 42 can be lifted off its seat 40 by the pressure of the fluid itself so that it is immaterial during movement of the piston 11 to the left whether or not the cam 50 holds valve 42 off its seat, but the valve 36 must be held off its seat by the cam 49. Hence, the crank arm 27 is so adjusted with respect to the cam shaft 26 and the cam sleeve 44 is so adjusted with respect to the shaft 26 that the flat on the cam 49 moves under the valve 36 to permit the latter to close against its seat 33 as the piston 11 moves leftward into the position shown in Figs. 1 and 3.

The piston 11 will then remain in the position shown, until the 4-way valve 15 is actuated to reverse the direction of flow and admit pressure fluid through the pipe 20 to the left end of the cylinder 10. Fluid will then flow from the right end of the cylinder 10 past the valve 42 so long as the latter is held off its seat by the cam 50, thence past the valve 36 irrespective of whether or not it is held off its seat by the cam 49, and thence through the pipe 19 and the valve 15 and pipe 18 back to the reservoir 13. Movement of the piston 11 to the right will continue until the flat on the cam 50 rides under the valve 42 permitting the latter to close and prevent further flow of fluid from the right end of cylinder 10.

The position of the piston 11 in which the valve 42 closes depends upon only the setting of the crank arm 27 on the cam shaft 26, whereas the timing of the valve 36 with respect to the piston 11 depends both upon the setting of the crank arm 27 with respect to the cam shaft 26 and the setting of the cam sleeve 44 with respect to the cam shaft 26.

In practice, it is convenient to adjust the valve 16 to provide the desired limitation of travel of the piston 11 as follows: First the set screw 30 is loosened, and the cam shaft 26 and cam sleeve 44 are rotated as a unit until the flat on the cam 50 is positioned under the valve 42, permitting the latter to close. The foregoing operation is performed while the manual valve 15 is in neutral position. The valve 15 is then shifted to apply pressure fluid through the pipe 20 to the left end of the piston 11, movement of the piston 11 being prevented at this time by the fact that the valve 42 is seated. The operator then rocks the shaft 26 slightly (using the set screw 48 as a handle) to cause the cam 50 to lift the valve 42 from its seat and permit slow movement of the piston 11. He watches the movement of the piston rod 12 and stops the rod when it has moved into the desired limit position, by restoring the cam shaft 26 sufficiently to close the valve 42. The cam shaft 26 is then locked to the crank 27 by tightening the set screw 30. This adjustment will thereafter always stop the piston 11 at the same point during movement to the right, thereby determining the right limit position.

To adjust the leftward limit position, the operator then loosens the set screw 48 and rotates the cam sleeve 44 in position to seat the valve 36, this being done while the 4-way valve 15 is in neutral position. The valve 15 is thereafter moved into the position shown in Fig. 3, to apply pressure fluid through the pipe 19, and the cam sleeve 44 is then rocked slightly to open the valve 36 and permit flow of fluid through the valve 16 into the right end of cylinder 10 to move the piston 11 to the left. The operator watches the movement of the piston rod 12 and stops it when it has reached the desired leftmost position by rocking the cam sleeve 44 sufficiently to close the valve 36. He then tightens the set screw 48.

It is to be noted that there is nothing within the valve 16 to prevent unlimited rotation of the cam shaft and the cam sleeve, so that no damage can result from accidental movement of the jack piston beyond the limits set by the valve.

Although for the purpose of explaining the invention, a particular embodiment thereof has been shown and described, obvious modifications will occur to a person skilled in the art, and we do not desire to be limited to the exact details shown and described.

We claim:

A movement-limiting valve mechanism for attachment to a hydraulic motor having a fluid port and a movable member adapted to be moved in response to flow of fluid through said port, said valve mechanism comprising: a housing having a fluid passage therethrough adapted to be connected in series with said fluid port of said hydraulic motor; a pair of valve seats in opposed series relation in said fluid passage, and a pair of valve elements movable against said seats to close them; spring means urging said elements against their seats; a first rotatable cam support carrying a cam for lifting one of said elements off its seat; a second rotatable cam support concentric with said first support and carrying a cam for lifting the other of said elements off its seat; means for releasably locking said cam supports against movement relative to each other, and means linking one of said cam supports to said movable member of said motor for movement thereby.

CLINTON E. DEARDORFF.
WILLIAM E. ELDER.

REFERENCES CITED

The following references are of record in the file of this patent:

UNITED STATES PATENTS

| Number | Name | Date |
|---|---|---|
| 2,300,112 | Ellinwood | Oct. 27, 1942 |
| 2,383,689 | Silver | Aug. 28, 1945 |
| 2,447,968 | Trotter | Aug. 24, 1948 |